United States Patent Office 2,711,020
Patented June 21, 1955

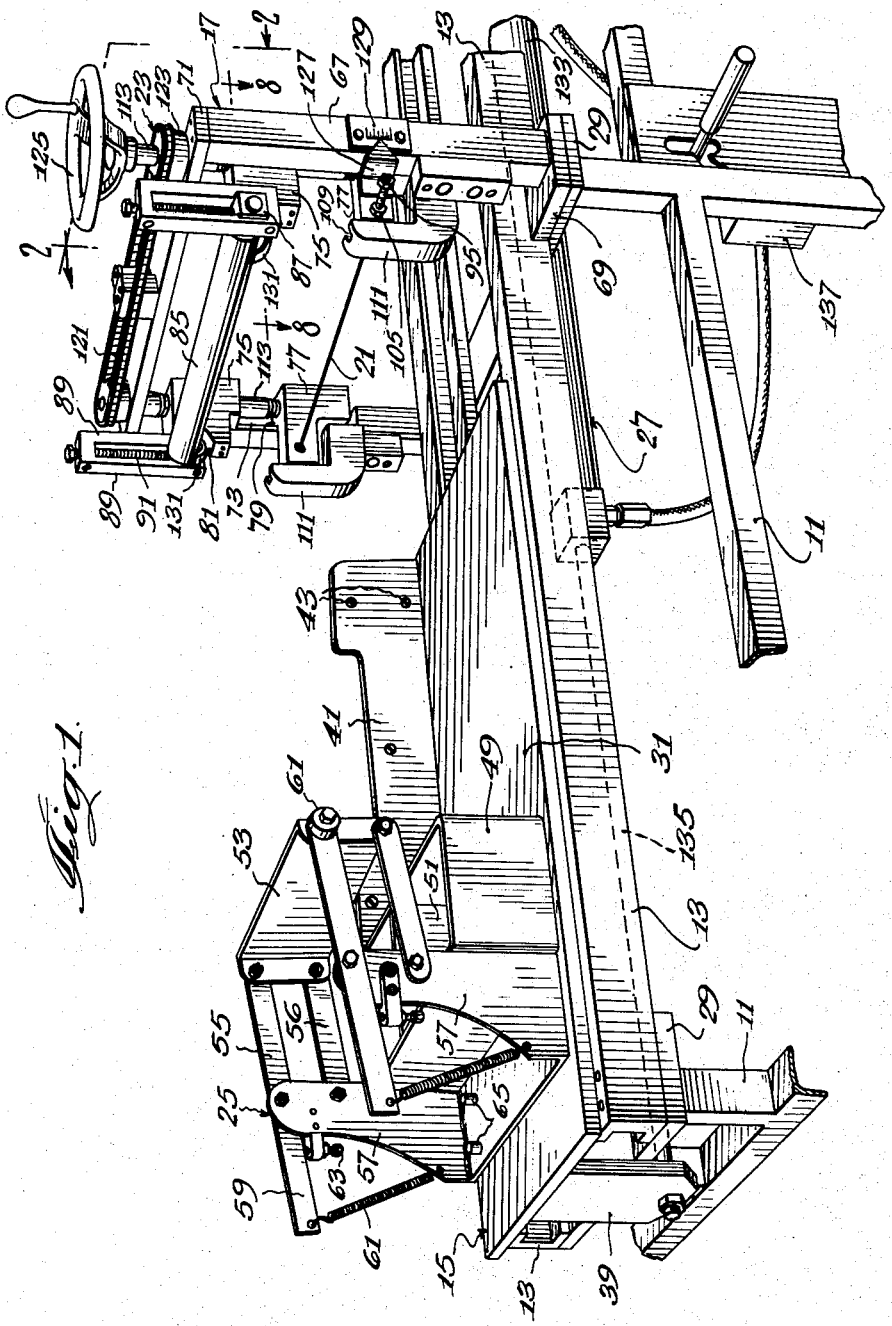

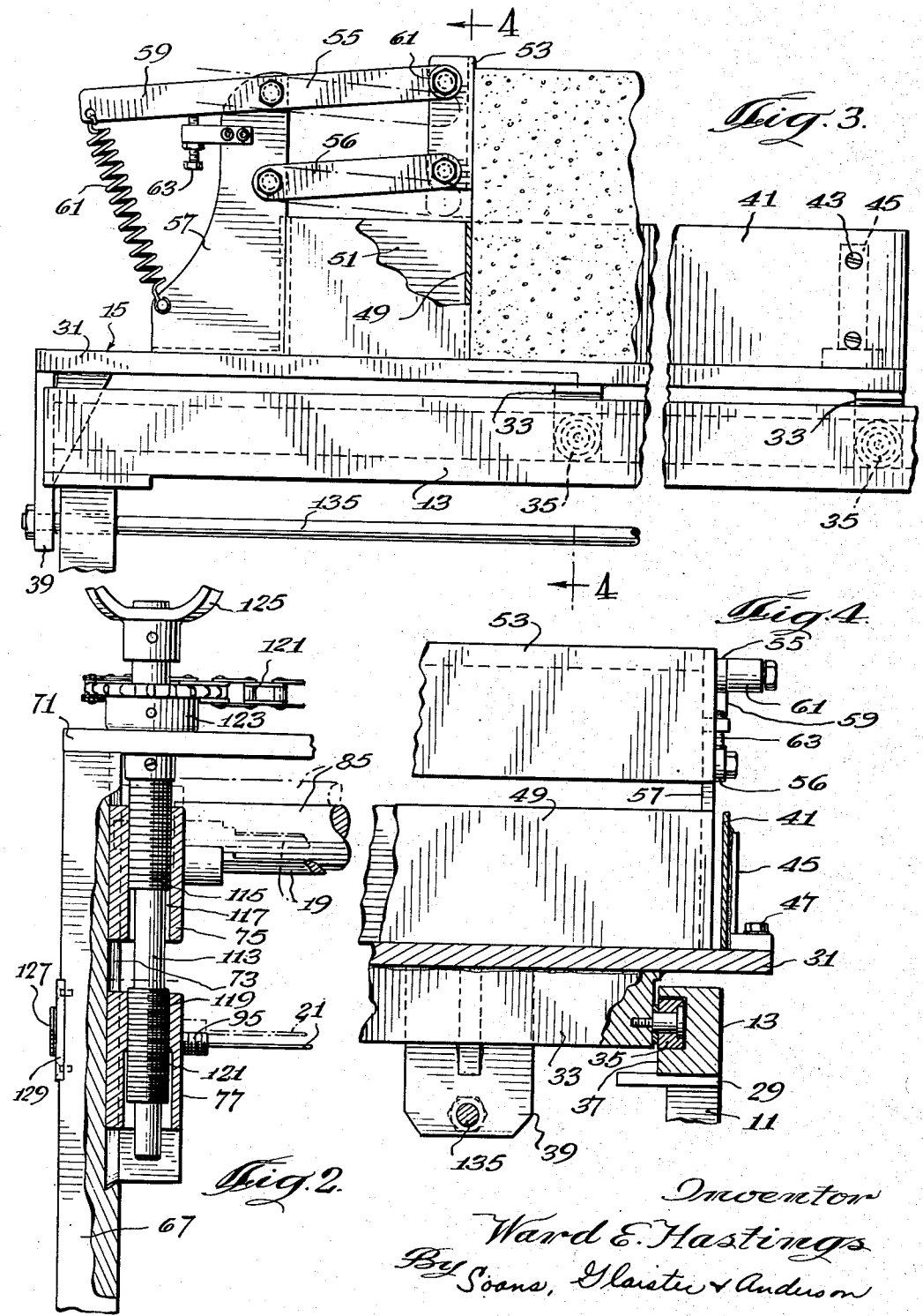

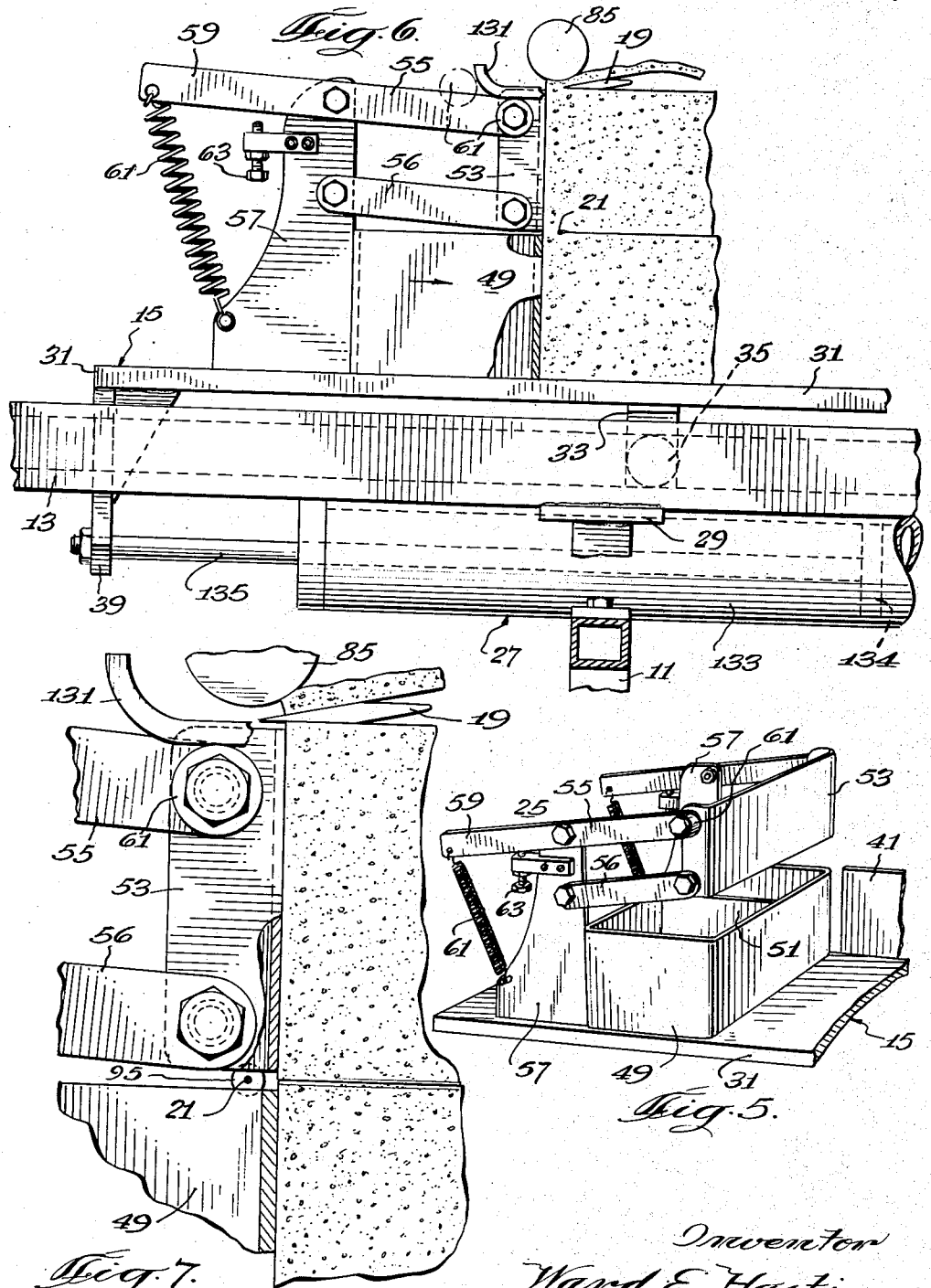

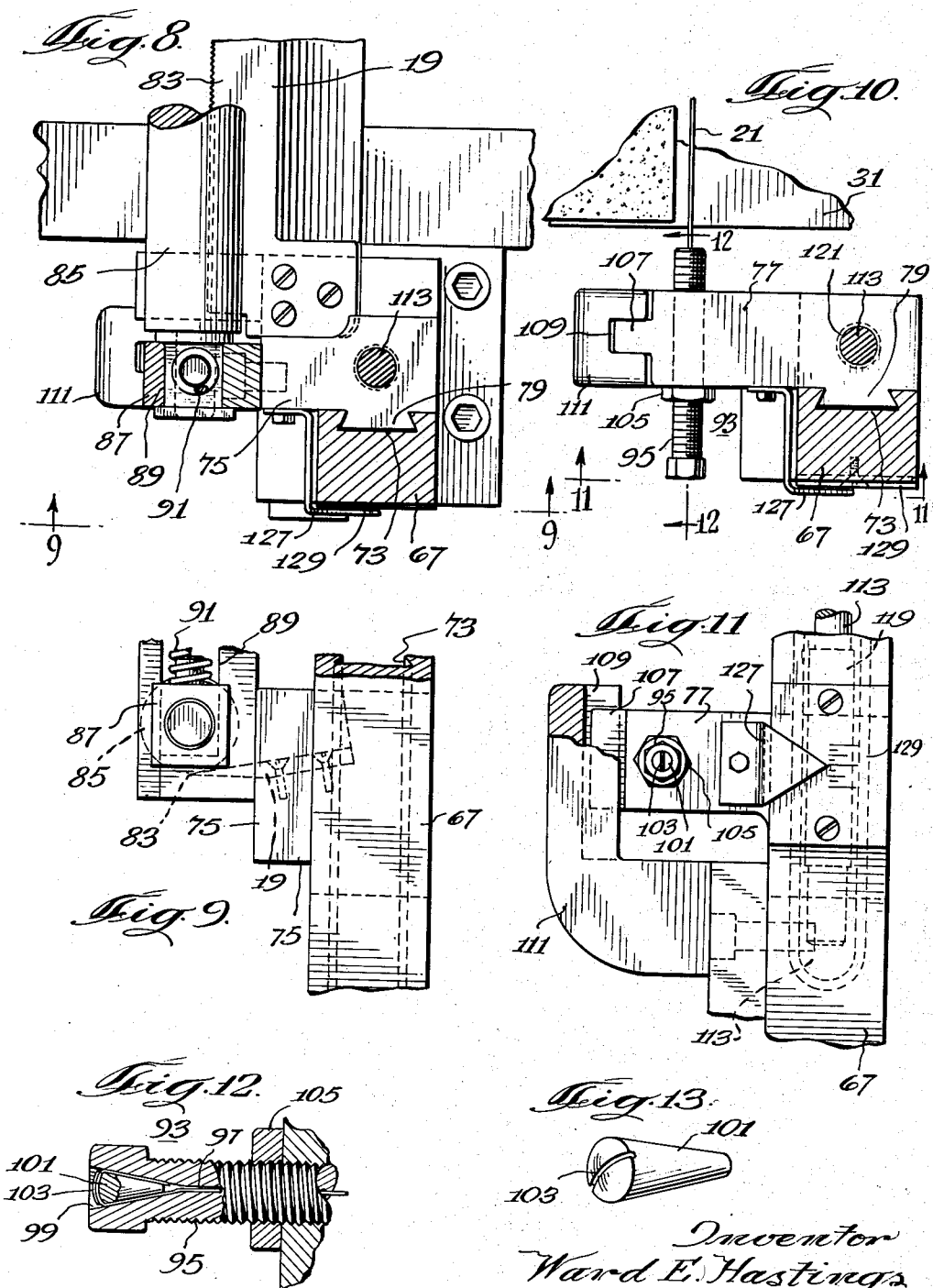

2,711,020

CHEESE CUTTING APPARATUS

Ward E. Hastings, Chicago, Ill., assignor to Kraft Foods Company, Chicago, Ill., a corporation of Delaware Application September 14, 1950, Serial No. 184,789

6 Claims. (Cl. 31—20)

This invention relates to apparatus for cutting cheese or similar material and, more particularly, for trimming and splitting an irregularly shaped block of cheese.

Natural cheese is manufactured in relatively large blocks which may be irregularly shaped as a result of certain steps in their manufacture and which, whether sold as large blocks or subsequently divided for sale as smaller blocks, may therefore require trimming. For example, one or more of the surfaces of the cheese block may be oblique relative to the other surfaces or various of the surfaces may have local deformities such as isolated ridges or depressions. Since these irregularities are rarely uniform from block to block, the amounts of cheese required to be removed from individual blocks to produce blocks of regular shape may vary substantially. In a multiple cutting operation, it is therefore necessary to rearrange the various cutting elements relative to one another and to the block to be cut, according to the amount of trimming which may be necessary in each individual case.

Accordingly, it is the principal object of this invention to provide an improved apparatus for trimming and splitting blocks of cheese wherein the various operative elements of the apparatus are properly aligned relative to one another and to the block of cheese being trimmed by a single manual adjustment.

Other objects and advantages of the invention will become apparent and the invention will be better understood by reference to the following specification and to the accompanying drawings in which there is illustrated a preferred embodiment of the invention.

In the drawings:

Figure 1 is a perspective view of the apparatus in its preferred form showing the cutting elements, the adjusting means, the movable carriage and the automatically adjustable backing plate or pusher which constitute the principal elements of the apparatus in its preferred form;

Figure 2 is an enlarged, partly sectional, elevational view of the adjusting means by which the cutting elements are located relative to one another and to the movable carriage;

Figure 3 is an enlarged, fragmentary, side elevation, partly sectional, of the carriage illustrated in Figure 1 showing a block of cheese emplaced upon the movable carriage;

Figure 4 is a fragmentary sectional elevation taken along the line 4—4 of Figure 3 and illustrating the carriage mounting;

Figure 5 is a perspective view of the adjustable backing plate or pusher;

Figure 6 is a fragmentary side elevation similar to Figure 3 and showing the position of the backing plate or pusher relative to the cutting elements in the final portion of the trimming cut;

Figure 7 is an enlarged fragmentary side elevational view similar to Figure 6, but showing the relative positions of the cutting elements and the backing plate immediately after the cutting elements have passed through the block;

Figure 8 is an enlarged fragmentary sectional view taken along line 8—8 in Figure 1;

Figure 9 is a fragmentary elevational view taken along line 9—9 in Figure 8;

Figure 10 is a fragmentary plane view of the means employed for holding the splitting wire taut;

Figure 11 is an elevational view taken on line 11—11 in Figure 10;

Figure 12 is a sectional view taken on line 12—12 in Figure 10; and

Figure 13 is a perspective view of a plug which constitutes a part of the means illustrated in Figure 10 for holding the wire taut.

The preferred form of the apparatus illustrated in its entirety in Figure 1 comprises a normally stationary sub-frame 11 having mounted on its upper side a pair of longitudinally extending, channel-shaped rails 13 on which there is supported a movable carriage 15. Straddling the rails is a cutting head 17 which includes an upper horizontally disposed trimming blade 19 and the intermediate horizontally disposed splitting wire 21 and an adjusting mechanism 23 for altering the height of the blade and the wire above the carriage. Mounted on the upper surface of the carriage 15 is a backing plate or pusher 25 against which a block of cheese to be trimmed is firmly seated and which pushes the block into the trimming blade and splitting wire. Supported on the sub-frame 11 beneath the rails 13 is a suitable hydraulic or other type driving means 27 which is operable to move the carriage along the track relative to the cutting head. When the driving means 27 is energized, the carriage 15 and the block of cheese supported thereon are advanced into the cutting head 17 whereupon the upper surface of the block is trimmed and the block is simultaneously split longitudinally along an intermediate horizontal plane.

Referring to the component parts of the apparatus in greater detail, the sub-frame 11 is desirably of welded angle-iron construction and is provided on its upper side with suitably spaced plate or flange members 29 which provide surfaces for supporting the carriage rails 13 and the cutting head 17. The channel-shaped carriage rails are rigidly secured to the plate members 29 with their open sides facing one another so as to provide tracks for guiding the movement of the carriage 15, as will later be described.

The carriage 15 comprises a horizontally disposed rigid plate member or platform 31 supported upon an under-frame 33 (Fig. 4) having on each side a pair of spaced rollers 35 which ride upon the lower flanges 37 of the opposed rails 13. The rollers 35 are slightly smaller in diameter than the spaces between the upper and lower flanges so that the rollers will roll freely and yet any substantial upward displacement of the carriage will be prevented. Securely attached to the carriage under-frame 33 is a bracket 39 to which the driving means 27 is rigidly secured.

The carriage 15 is provided along one of its sides with an upwardly extending guide plate 41 which cooperates with the backing plate or pusher 25 to provide mutually perpendicular vertical surfaces for locating a block of cheese upon the carriage. The guide plate 41 may be of simple construction, such, for example, as a suitably shaped metal plate attached by means of screws 43 to brackets 45 (Fig. 4) secured to the carriage by means of bolts 47. The backing plate or pusher 25 may be of similar construction and comprises a box-like lower stationary portion 49 having a central re-enforcing brace 51, and a vertically adjustable upper portion 53 mounted by means of vertically spaced, parallel links 55 and 56 upon a pair of upright standards 57. The upper links 55 are provided with rearward extensions 59 suitably connected to the standards 57 by means of tension springs 61 which urge the upper movable portion 53 of the backing plate upwardly. Extending sidewardly from each side of the upper, movable portion 53 of the backing plate is a roller 61 journalled co-axially with the pivotal connection of the upper pair of links with the movable backing plate portion. The rollers 61 are disposed to engage inclined surfaces on the cutting head 17 so as to dispose the upper backing plate portion 53 in proper relation to the trimming blade 19, as will subsequently be described.

Each of the standards 57 is provided with an adjusting screw 63, the end of which abuts the underside of the associated rearward link extension 59 to limit the upward travel of the movable back plate portion 53. The lower stationary portion 49 of the backing plate is preferably formed integral with the standards 57 and the entire backing plate 25 is rigidly secured to the carriage surface by means of cap screws 65.

The cutting head 17 comprises a pair of vertical members 67 having base flanges 69 by which the cutting head is securely attached to one of the plate members 29 and an upper horizontal cross member 71 joined to the upper ends of the vertical members 67 to form an inverted, U-shaped frame which straddles the guide rails 13. Each vertical member 67 is provided along its inner side with a dove-tail slot 73 for guiding the movement of vertically spaced mounting blocks 75 and 77, each of which is provided on its outer side with a suitable dove-tail projection 79 engaging the slot, as shown in Figure 1. The knife blade 19 extends between and is supported upon the upper blocks 75 and is rigidly secured thereto. The upper surfaces 81 of the upper mounting blocks 75 are appropriately inclined (Fig. 1) so that the knife blade 19 will be presented to the block of cheese at the proper angle.

Supported above the knife blade 19 with its axis disposed forwardly of the cutting edge 83 is a horizontally disposed roller 85 journalled at its ends in bearing blocks 87 which are vertically movable in guides 89 secured to the upper mounting blocks 75. A compression spring 91 disposed between the guides 89 urges the bearing blocks 87, and hence the rollers 85, downwardly so that when the apparatus is not in use, the roller rests adjacent the knife blade 19. However, when the apparatus is in operation and a block of cheese is being cut, the advancing upper edge of the cheese block lifts the roller 85, compressing the springs 91 which, in turn, urge the roller downwardly against the upper surface of the block to compress the cheese in the area immediately below the roller 85 and adjacent the cutting edge 83 of the blade.

As the cheese block is propelled through the cutting head, the roller 85 rides on the upper surface of the block, accommodating itself to the variations in that surface and exerting a downward compressive force proportional to its upward displacement from the blade 19. The bearing blocks 87 are separately movable in their respective guides 89 so that the ends of the roller 85 may rise and fall unevenly as when the oncoming surface of the block slopes to one side or the other, a greater force being applied to the cheese in the area where the surface layer being removed is thicker.

The horizontally disposed splitting wire 21 extends between the lower mounting blocks 77, its ends being secured in the blocks by means of wire anchors 93, as illustrated in Figures 10, 12, and 13. Each anchor comprises a machine screw 95 provided with a central, longitudinally extending hole 97 which flares outwardly at the head end of the screw to form a seat 99 for a tapered plug 101. The splitting wire 21 passes around the taper plug 101 and is seated in a groove 103 at the large end of the plug. It will be appreciated from Figure 12 that the wire 21 is securely anchored by jamming the plug 101 in the flared central opening in the screw and that increasing tension of the wire tends to anchor it all the more firmly.

The tension of the wire may be increased by simply turning the screw 95 outwardly and any desired tension may be maintained by means of a lock nut 105 (Figs. 10 and 12). To prevent the lower mounting blocks 77 from becoming jammed in the dove-tail slots 73 under the effect of the wire tensioning forces which act well forwardly of the slots 73, the lower mounting blocks 77 are provided at their forward ends with tongues 107 which engage a vertical groove 109 in an auxiliary supporting bracket 111 firmly secured to the vertical members 67 of the cutting head 17 (Figs. 1, 10 and 11).

The vertical adjustment of the trimming blade 19 and splitting wire 21 relative to one another and to the supporting surface of the carriage 15, is effected by a pair of vertical adjusting screws 113 (Figs. 1 and 2) having upper threaded portions 115 engaging threaded holes 117 in the upper mounting blocks 75, and lower threaded portions 119 engaging threaded holes 121 in the lower blocks 77. To maintain the horizontal disposition of the blade and wire, the rotation of the screws 113 is synchronized by an endless chain 121 trained around sprockets 123 keyed or otherwise secured to the adjusting screws 113. A hand wheel 125 secured to one of the screws 113 is therefore effective to raise or lower the trimming blade 19 and splitting wire 21 in unison.

To enable the apparatus to be employed for trimming and splitting blocks which vary in size, the adjusting means 23 is so arranged as to maintain a fixed ratio between the vertical distance between the surface of the carriage 15, the trimming blade 19 and splitting wire 21. In the illustrated apparatus, which is designed for splitting a block along its median horizontal plane, the height of the trimming blade 19 is exactly double that of the splitting wire 21. This relationship is maintained irrespective of the value of those distances by providing the threaded portion 119 which engages the lower pair of blocks 77 with half the lead of the threaded portion 115 which engages the upper blocks 75. With this arrangement, any given displacement of the splitting wire 21 will be accompanied by a displacement of the trimming blade 19 of twice the magnitude in the same direction. Obviously, any other given ratio between the height of the trimming blade and the height of one or more splitting wires may be maintained by providing the adjusting screw 113 with separate threaded portions each having the proper lead. In the illustrated apparatus, a pointer 127 secured to one of the lower mounting blocks 77 travels along a scale 129 secured to the adjacent vertical member 67 of the cutting head to render an indication of the distance between the trimming blade 19 and the surface of the plate 31 of the carriage 15, or any other indication which may be deemed suitable.

In view of the substantial force required to propel the cheese through the cutting head, it is desirable to support the rear surface of the block as closely as possible beneath the plane of the advancing cutting edge 83 of the blade 19 in order to prevent the cheese from breaking and forming a ragged edge at the end of the block. In the preferred embodiment of the invention, this is accomplished by making the upper portion 53 of the backing plate or pusher 25 vertically adjustable, as previously described. The proper position of the upper portion 53 of the backing plate 25 relative to the cutting edge 83 of the blade 19 is automatically effected by the engagement of the rollers 61 carried on the sides of the movable backing plate portion 53 with cams 131 carried by the upper mounting blocks 75, as shown in Figure 1. The cam 131 is so positioned relative to the knife blade 19 and the rollers 61 are so positioned relative to the upper edge of the movable backing plate portion 53 that the upper edge of the movable backing plate passes under the knife blade 19 in close proximity therewith. In this way, the proper coordination of the upper edge of the movable backing plate portion and the knife blade is automatically effected irrespective of the height of the knife blade above the carriage surface.

The movable upper backing plate portion 53 is preferably proportioned so that when the trimming blade 19 and splitting wire 21 are depressed the maximum amount, that is, are moved as closely as possible to the upper surface of the carriage 15, the distance between the splitting wire and the trimming blade will be greater than the vertical dimension of the movable backing plate portion. This relationship of dimensions is most clearly illustrated in Figure 7 from which it may be seen that when the blade and wire are fully depressed, the distance between the movable portion 53 and the stationary portion 49 of the backing plate is considerably greater than the diameter of the splitting wire, thus permitting the splitting wire to move freely between the upper and lower portions. The position of the upper edge of the lower or stationary backing plate portion 49 relative to the splitting wire 21 is not as critical as the position of the upper portion relative to the trimming blade because, in all cases, the rear surface of the block of cheese is supported both above and below the plane of movement of the splitting wire 21 and there is, therefore, less tendency to break the cheese during the final portion of the splitting cut.

In the preferred embodiment, the driving means 27 is of the hydraulic type although any suitable alternative driving means, such as a rack-and-pinion may be employed. The illustrated driving means comprises a double-acting hydraulic cylinder 133 horizontally mounted on the sub-frame 11 and containing a piston 134 (Fig. 6) connected by means of a connecting rod 135 to the bracket 39 secured to the movable carriage 15. A hand-operated control valve 137 (Fig. 1) accessible to the operator standing at the side of the apparatus, controls the admission of fluid under pressure to either one side or the other of the driving piston in order to move the carriage 15 in either direction along the rails 13.

The type of cheese block for which the illustrated apparatus was especially designed is one which, when taken from the hoop, has a fairly smooth bottom surface and side surfaces, but which has an upper surface of unpredictable configuration and alignment. Therefore, the only surface which needs to be trimmed is the upper surface, and it is possible to split the block and trim its upper surface in a single operation. It will be apparent, however, that the invention is not limited to the inclusion of a simultaneous splitting operation, or to employment in trimming cheese blocks having only one surface to be trimmed.

The operation of the apparatus is believed to be self-evident from the foregoing description, but may be described briefly as follows: a block of cheese of known size is placed upon the carriage 15 and firmly seated against the guide plate 41 and backing plate 25. The operator then adjusts the trimming blade 19 to the proper height, which in the case of the illustrated apparatus, also positions the splitting wire 21 so as to pass through the block midway between its lower surface and the new upper surface formed by the trimming operation. The operator then energizes the driving means 27 which advances the carriage into the cutting head 17 thereby simultaneously trimming and splitting the block of cheese.

It will be apparent from the foregoing description that by simply adjusting the height of the trimming blade so as to remove a surface layer of the desired thickness, the splitting wire simultaneously assumes a new position in proper relation to the blade, and the desired relation of the backing plate and trimming blade is automatically effected during the progress of the cut. In this manner, the proper coordination of all movable elements of the apparatus is re-established for a new condition by means of a single adjustment.

Various of the features of the invention which are believed to be new are set forth in the appended claims.

I claim:

1. Apparatus for removing a surface layer from a block of cheese or the like, comprising block supporting means, a knife blade, knife blade supporting means positioning said knife blade to pass through the block of cheese from one end to the other along a predetermined plane beneath the surface layer, moving means effecting relative movement between said knife blade and said block, a backing member connected to said support means for abutting said block at said other end, said backing member extending generally perpendicular to the plane of said supporting means and being movable toward and away from said support means in its plane, resilient means connected with said backing member and urging said backing member away from said support means, and interengaging means on said knife blade and said backing member for moving said backing member toward said support means so as to dispose said backing member a predetermined distance from said plane to prevent the edge of said block from tearing during the final portion of said cut.

2. Apparatus for removing a surface layer from a block of cheese or the like, comprising block supporting means, a knife blade, knife blade supporting means positioning said knife blade to pass through the block of cheese from one end to the other along a predetermined plane beneath the surface layer, moving means effecting relative movement between said knife blade and said block, a backing member extending in a plane generally perpendicular to the plane of said supporting means and connected to said support means for abutting said block at said other end, said blade and said backing member being separately movable toward and away from said support means in a direction generally perpendicular to the plane of said relative movement, blade supporting means located at a selected distance from said support means, resilient means connected with said backing member for urging said backing member away from said support means, and interengaging means on said blade and said backing member for moving said backing member toward said support means as said backing member approaches said blade whereby said backing member is automatically disposed a fixed predetermined distance from said blade during the final portion of the cut.

3. Apparatus for removing the surface layer from a block of cheese or the like comprising a horizontal block supporting platform, a horizontally disposed knife blade supported above said platform, moving means effecting relative movement between said knife blade and said platform so as to pass said knife blade through said block from one end to the other beneath said surface, said blade being vertically adjustable, a vertical backing plate on said platform in position for abutting said other end of the block, said plate being connected with said platform for vertical movement relative to said platform, resilient means connected with said backing plate for urging said backing plate upwardly, and inter-engaging means on said blade and said backing plate for moving said backing plate downwardly as said backing plate approaches said blade whereby said backing plate is automatically disposed a predetermined distance beneath said blade during the final portion of the cut.

4. Apparatus for removing the surface layer from a block of cheese or the like comprising a horizontal block supporting platform, a horizontally disposed knife blade supported above said platform by vertically adjustable means connected to said knife blade, moving means effecting relative movement between said knife blade and said platform so as to pass said knife blade through said block from one end to the other beneath said surface, a vertical backing plate on said platform in position for abutting said other end of the block, said plate being connected with said platform for vertical movement relative to said platform, resilient means connected with said backing plate for urging said backing plate upwardly, a cam surface associated with said blade and engageable by said backing plate for moving said backing plate downwardly so that said backing plate is automatically disposed a predetermined distance beneath said blade during the final portion of the cut.

5. Apparatus for removing the surface layer from a block of cheese or the like comprising a normally stationary horizontal track, a carriage movable on said track for supporting said block, a normally stationary, horizontally disposed knife blade supported above said track and carriage by means affording vertical adjustment of said knife blade so as to pass said knife blade through said block from one end to the other at a selected distance beneath said surface, means for moving said carriage along said track, a vertical backing plate on said carriage in position for abutting said other end of the block, said plate being vertically movable on said carriage, resilient means connected with said backing plate for urging said plate upwardly, cam means associated with said blade and engageable by said plate for moving said plate downwardly as said plate approaches said blade whereby said backing plate is automatically disposed a predetermined distance beneath said blade during the final portion of the cut.

6. Apparatus for trimming and splitting a block of cheese comprising a horizontal block supporting platform, a trimming blade and a splitting wire, separate blade supporting means and wire in vertically spaced relation to one another and to said platform, adjusting means connected with said separate blade supporting means and wire for changing said spaced relation, said adjusting means including means operable to change the perpendicular distance between said wire and platform and the perpendicular distance between said blade and platform, respectively, by different amounts and maintaining a fixed ratio between said distances, said blade and wire being movable relative to said platform to pass through said block from one end to the other along horizontal planes, a backing plate mounted on said platform and having a generally vertical surface for abutting said block at said other end, said backing plate comprising a first member fixed relative to said platform and a generally coplanar, relatively movable second member disposed above said fixed member, resilient means connected with said movable backing member for urging the latter upwardly, and interengaging means on said blade support means and said movable backing member for moving the latter downwardly as said movable backing member and said blade approach a position of overlying relation, so as to dispose said movable backing member a predetermined distance beneath said blade during the final portion of the cut, said first and second backing plate members being proportioned in depth so that for any selected position of said trimmer blade and said splitting wire the latter passes above said fixed backing member, and so that when said movable backing member is depressed by said interengaging means the lower edge of said movable member lays above the path of said splitting wire, whereby said splitting wire may pass between said fixed and said movable backing members.

References Cited in the file of this patent
UNITED STATES PATENTS

| | | |
|---|---|---|
| 872,422 | Hodell | Dec. 3, 1907 |
| 874,094 | Low | Dec. 17, 1907 |
| 1,627,007 | Baker | May 3, 1927 |
| 1,715,210 | Pederson | May 28, 1929 |
| 1,796,447 | Foren | Mar. 17, 1931 |
| 1,935,676 | Stoll | Nov. 21, 1933 |
| 1,976,823 | Mahler | Oct. 16, 1934 |
| 2,216,103 | Taylor | Sept. 24, 1940 |
| 2,216,525 | Van Buren | Oct. 1, 1940 |
| 2,534,357 | Lang | Dec. 19, 1950 |